United States Patent
Jeon

(10) Patent No.: US 9,477,108 B2
(45) Date of Patent: Oct. 25, 2016

(54) DISPLAY DEVICE INCLUDING TOUCH PANEL AND METHOD OF FABRICATING THE SAME

(71) Applicant: LG DISPLAY CO., LTD., Seoul (KR)

(72) Inventor: Jun-Tae Jeon, Gumi-si (KR)

(73) Assignee: LG DISPLAY CO., LTD., Seoul (KR)

(*) Notice: Subject to any disclaimer, the term of this patent is extended or adjusted under 35 U.S.C. 154(b) by 132 days.

(21) Appl. No.: 14/074,394

(22) Filed: Nov. 7, 2013

(65) Prior Publication Data

US 2014/0160369 A1    Jun. 12, 2014

(30) Foreign Application Priority Data

Dec. 6, 2012   (KR) .................. 10-2012-0141185

(51) Int. Cl.
    *G02F 1/1333*   (2006.01)
    *G06F 3/0488*   (2013.01)

(52) U.S. Cl.
    CPC ..... *G02F 1/133345* (2013.01); *G02F 1/13338* (2013.01); *G06F 3/0488* (2013.01); *G02F 2001/133311* (2013.01)

(58) Field of Classification Search
    CPC .............. G02F 1/13338; G02F 1/133345; G02F 2001/133311; G06F 3/0488
    See application file for complete search history.

(56) References Cited

U.S. PATENT DOCUMENTS

| | | | |
|---|---|---|---|
| 7,599,018 B2* | 10/2009 | Shen .................. | G02F 1/133308 349/58 |
| 9,164,309 B2* | 10/2015 | Rappoport ............. | G02B 1/118 |
| 2006/0097991 A1* | 5/2006 | Hotelling et al. ............ | 345/173 |
| 2007/0132906 A1 | 6/2007 | Shen et al. | |
| 2013/0021573 A1* | 1/2013 | Lim ..................... | G02F 1/13394 349/155 |
| 2013/0141347 A1* | 6/2013 | Wu ........................ | G06F 3/041 345/173 |
| 2015/0199053 A1 | 7/2015 | Hotelling et al. | |

FOREIGN PATENT DOCUMENTS

| | | |
|---|---|---|
| CN | 1942853 A | 4/2007 |
| CN | 1979277 A | 6/2007 |

* cited by examiner

*Primary Examiner* — Richard Kim
*Assistant Examiner* — Kendrick Hsu
(74) *Attorney, Agent, or Firm* — Birch, Stewart, Kolasch & Birch, LLP

(57) ABSTRACT

A display device includes: a cover glass; a first adhesive layer under the cover glass; a touch film attached to the cover glass by the first adhesive layer; a passivation layer in an edge portion of a lower surface of the touch film; a second adhesive layer under the touch film; and a display panel attached to the touch film by the second adhesive layer, the passivation layer exposed outside the display panel.

14 Claims, 4 Drawing Sheets

DISPLAY DEVICE INCLUDING TOUCH PANEL AND METHOD OF FABRICATING THE SAME

The present application claims the priority benefit of Korean Patent Application No. 10-2012-0141185 filed in the Republic of Korea on Dec. 6, 2012, which is hereby incorporated by reference in its entirety.

BACKGROUND

1. Field of the Disclosure

The present disclosure relates to a display device including a touch panel, and more particularly, to a display device including a touch panel having a passivation layer on an edge portion of a rear surface thereof and a method of fabricating the display device.

2. Discussion of the Related Art

As the information age progresses, display devices processing and displaying a large amount of information have been rapidly developed. Specifically, various flat panel displays (FPDs) such as a liquid crystal display (LCD) device, a plasma display panel (PDP) device, an organic light emitting diode (OLED) display devices and a field emission display (FED) device having a superior performance with a thin profile, a light weight, and a low power consumption have substituted for a cathode ray tube (CRT).

Recently, a touch display device, referred to as a touch screen, where a touch panel is attached to a display panel has been widely used. The touch display device is used as an output means for displaying an image and is also used as an input means for receiving a command of a user by touch of a portion of the image. The touch panel is classified into a resistive type, a capacitive type, an infrared type and an ultrasonic type.

When a user watches the image displayed by the display panel and touches the touch panel, the touch panel detects position information of the touched portion and perceives the user's command by comparing the position information of the touched portion and the position information of the image.

The touch display device may be fabricated by attaching a separate touch panel to a display panel, or may be fabricated as an integrated device by forming a touch panel on a substrate for a display panel.

A structure of a touch display device will be illustrated with reference to a drawing hereinafter.

FIG. 1 is a cross-sectional view showing a glass-film-film (GFF) type touch display device according to the related art.

In FIG. 1, a GFF type touch display device 10 according to the related art includes a display panel 20 displaying an image and a touch panel 30 over the display panel 20. The touch panel 30 detects position information corresponding to a touch point by a user.

The touch panel 30 includes a cover glass 40, and first and second touch films 50 and 60 sequentially disposed under the cover glass 40. A first adhesive layer 70 is formed between the cover glass 40 and the first touch film 50 so that the first touch film 50 can be attached to the cover glass 40 by the first adhesive layer 70. A second adhesive layer 72 is formed between the first and second touch films 50 and 60 so that the second touch film 60 can be attached to the first touch film 50 by the second adhesive layer 72. In addition, a third adhesive layer 74 is formed between the second touch film 60 and the display panel 20 so that the display panel 20 can be attached to the second touch film 60 by the third adhesive layer 74.

A plurality of first lines 52 are formed on the first touch film 50 and a plurality of second lines 62 are formed on the second touch film 60. The plurality of first lines 52 may transmit a driving signal and the plurality of second lines 62 may receive a detecting signal. In addition, a crossing portion of the plurality of first lines 52 and the plurality of second lines 62 constitute a capacitor having a variable capacitance according to touch of the user.

Although the GFF type touch display device 10 has been widely used, total thickness and fabrication cost of the GFF type touch display device 10 increase due to the first and second touch films 50 and 60 and the second adhesive layer 72 attaching the first and second touch films 50 and 60.

For the purpose of reducing the total thickness and the fabrication cost, a glass-film-two (GF2) type touch display device using a single touch film has been suggested and a structure of a GF2 type touch display device will be illustrated with reference to a drawing hereinafter.

FIG. 2 is a cross-sectional view showing a GF2 type touch display device according to the related art.

In FIG. 2, a GF2 type touch display device 110 according to the related art includes a display panel 120 displaying an image and a touch panel 130 over the display panel 120. The touch panel 130 detects position information corresponding to a touch point by a user.

The touch panel 130 includes a cover glass 140, a touch films 150 under the cover glass 140 and a protecting film 160 under the touch film 150. A first adhesive layer 170 is formed between the cover glass 140 and the touch film 150 so that the touch film 150 can be attached to the cover glass 140 by the first adhesive layer 170. A second adhesive layer 172 is formed between the protecting film 160 and the display panel 120 so that the display panel 120 can be attached to the protecting film 160 by the second adhesive layer 172.

A plurality of first lines 152 are formed on an upper surface of the touch film 150 and a plurality of second lines 154 are formed on a lower surface of the touch film 150. The plurality of first lines 152 may transmit a driving signal and the plurality of second lines 154 may receive a detecting signal. In addition, a crossing portion of the plurality of first lines 152 and the plurality of second lines 154 constitute a capacitor having a variable capacitance according to touch of the user.

The protecting film 160 under the touch film 150 may protect the plurality of second lines 154 on the lower surface of the touch film 150. Since the touch film 150 is formed to have a size greater than a size of the display panel 120, an edge portion of the touch film 150 may constitute an exposing area A exposed outside the display panel 120. As a result, the plurality of second lines 154 in the exposing area A on the lower surface of the touch film 150 are exposed outside the display panel 120 and are corroded by moisture or contaminant in the atmospheric air to cause electrical opening.

For the purpose of preventing the electric open, the protecting film 160 is formed to cover the whole lower surface of the touch film 150. For example, the protecting film 160 may be formed of polyethylene terephthalate (PET) and may have a thickness equal to greater than about 0.1 mm.

However, since total thickness and fabrication cost increase due to the protecting film 160, comparative advantages of the GF2 type touch display device 110 as compared with the GFF type touch display device 10 (of FIG. 1) in thickness and fabrication cost are reduced.

SUMMARY OF THE INVENTION

Accordingly, the present invention is directed to a display device including a touch panel that substantially obviates one or more of the problems due to the limitations and disadvantages of the related art.

An object of the present disclosure is to provide a display device including a touch panel where deterioration of a line in an exposing area is prevented by a passivation layer and a method of fabricating the display device.

Another object of the present disclosure is to provide a display device including a touch panel where total thickness and fabrication cost are reduced by forming a passivation layer of an organic insulating material in an exposing area through a coating method or a printing method and a method of fabricating the display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a display device including: a cover glass; a first adhesive layer under the cover glass; a touch film attached to the cover glass by the first adhesive layer; a passivation layer in an edge portion of a lower surface of the touch film; a second adhesive layer under the touch film; and a display panel attached to the touch film by the second adhesive layer, the passivation layer exposed outside the display panel.

In another aspect, there is provided a method of fabricating a display device including: attaching a touch film to a cover glass by a first adhesive layer; forming a passivation layer in an edge portion of a lower surface of the touch film; and attaching a display panel to the touch film by a second adhesive layer such that the passivation layer is exposed outside the display panel.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments, examples of which are illustrated in the accompanying drawings.

Figure 1:
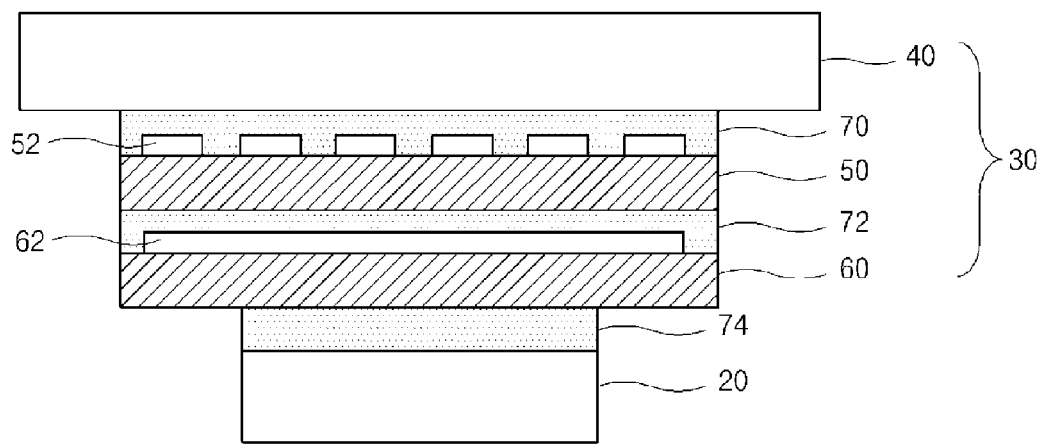
FIG. 1 is a cross-sectional view showing a glass-film-film (GFF) type touch display device according to the related art.
Figure 2:
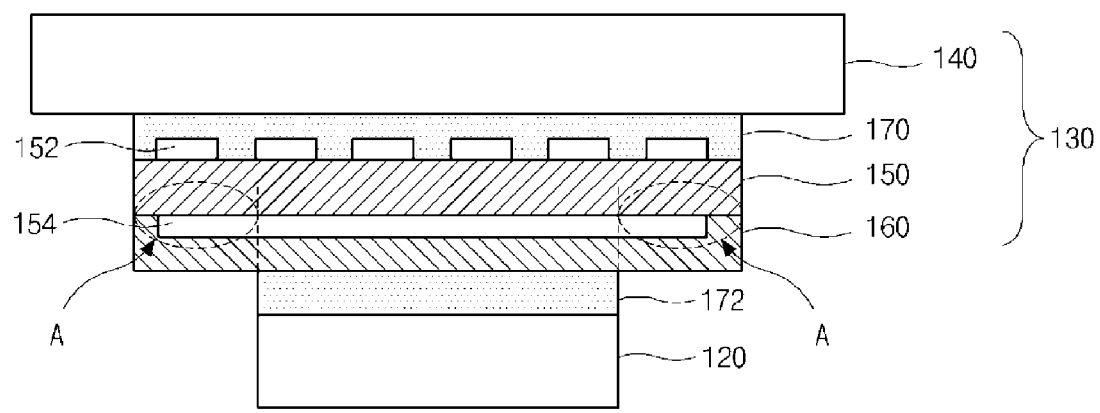
FIG. 2 is a cross-sectional view showing a GF2 type touch display device according to the related art.
Figure 3:
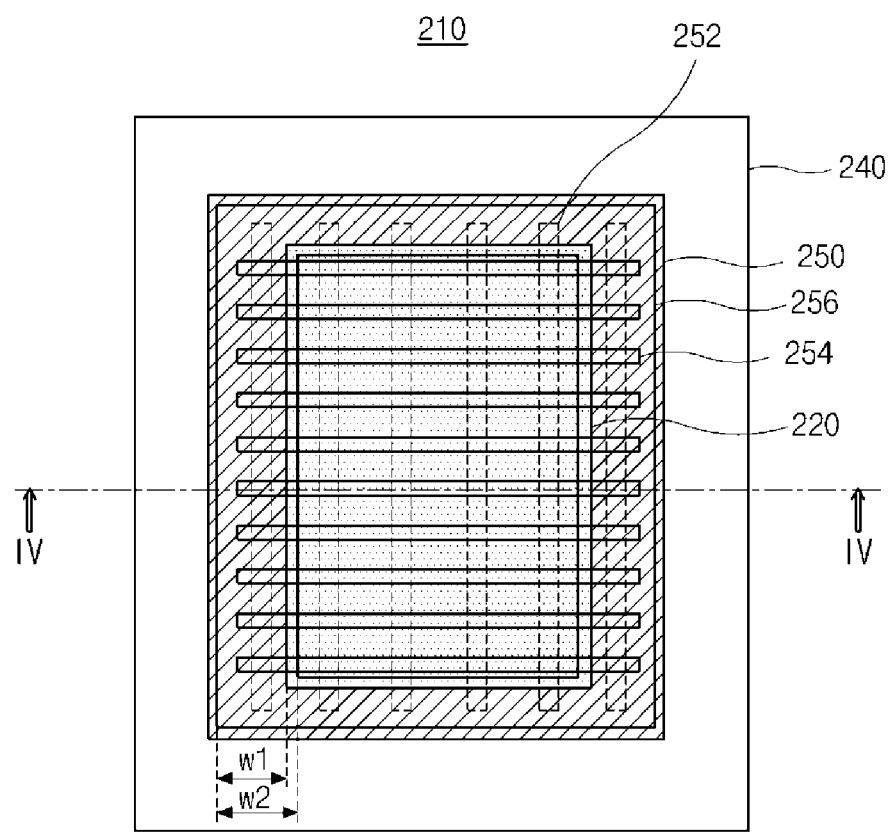
FIG. 3 is a plan view showing a lower surface of a display device including a touch panel according to an embodiment of the present invention.
Figure 4:
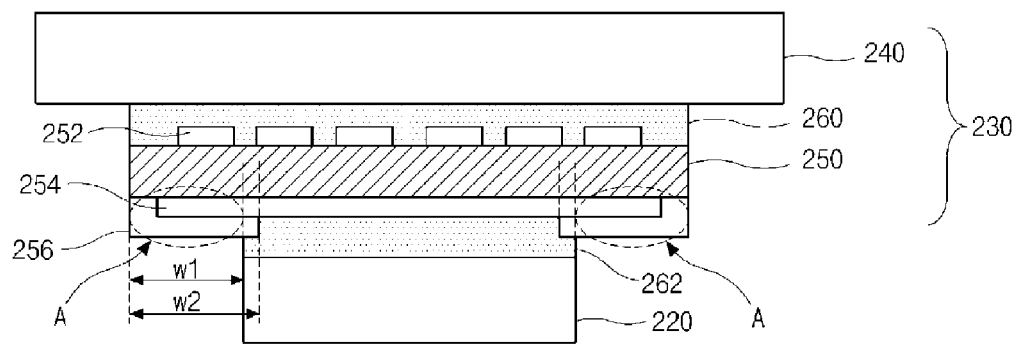
FIG. 4 is a cross-sectional view taken along a line IV-IV of FIG. 3.

FIG. 3 is a plan view showing a lower surface of a display device including a touch panel according to an embodiment of the present invention, and FIG. 4 is a cross-sectional view taken along a line IV-IV of FIG. 3.

In FIGS. 3 and 4, a display device 210 according to an embodiment of the present invention includes a display panel 220 for displaying an image and a touch panel 230 over the display panel 220. The touch panel 230 may detect position information corresponding to a touch point by a user.

The touch panel 230 may include a cover glass 240 and a touch film 250 under the cover glass 240. A first adhesive layer 260 may be formed between the cover glass 240 and the touch film 250 so that the touch film can be attached to the cover glass 240 by the first adhesive layer 260. A second adhesive layer 262 may be formed between the touch film 250 and the display panel 220 so that the display panel 220 can be attached to the touch film 250 by the second adhesive layer 262. The second adhesive layer 262 may directly contact the lower surface of the touch film 250. Each of the first and second adhesive layers 260 and 262 may include one of an optically clear adhesive (OCA) and an optically clear resin (OCR).

A plurality of first lines 252 may be formed on an upper surface of the touch film 250, and a plurality of second lines 254 may be formed on a lower surface of the touch film 250. The plurality of first lines 252 may be parallel to and be spaced apart from each other, and the plurality of second lines 254 may be parallel to and be spaced apart from each other. The plurality of first lines 252 may cross the plurality of second lines 254. In addition, the plurality of first lines 252 may be electrically insulated from the plurality of second lines 254, and a crossing portion of the plurality of first lines 252 and the plurality of second lines 254 may constitute a capacitor The plurality of first lines 252 may transmit a driving signal and the plurality of second lines 254 may receive a detecting signal. Alternatively, the plurality of second lines 254 may transmit a driving signal and the plurality of first lines 252 may receive a detecting signal. When a user touches a point of the touch panel 230 while the driving signal is applied, a capacitance of the capacitor is changed and position information of the touch point may be obtained by analyzing the detecting signal corresponding to the change in capacitance.

A passivation layer 256 may be formed on the plurality of second lines 254 in an exposing area A on the lower surface of the touch film 250. The passivation layer 256 may protect the plurality of second lines 254 exposed on the lower surface of the touch film 250. The touch film 250 may be formed to have a size greater than a size of the display panel 220, and an edge portion of the touch film 250 may constitute the exposing area A exposed outside the display panel 220. The plurality of second lines 254 in the exposing area A on the lower surface of the touch film 250 may be exposed outside the display panel 220 and may be corroded by moisture or contaminant in the atmospheric air to cause electrical opening. Since the passivation layer 256 covers the plurality of second lines 254 in the exposing area A, the deterioration such as an electrical opening may be prevented.

In the display device 210 according to an embodiment of the present invention, since the passivation layer 256 is exposed outside the display panel 220 instead of the plurality of second lines 254, penetration of moisture or contaminant in the atmospheric air is prevented.

The passivation layer 256 may have a shape corresponding to the exposing area A. For example, each of the passivation layer 256 and the exposing area A may have a rectangular ring shape in a plan view.

In another embodiment, the exposing area A may have various shape and the passivation layer 256 may have the same shape as the exposing area A so that the plurality of second lines 254 can be completely covered with the passivation layer 256.

The passivation layer 256 may be formed to partially overlap the second adhesive layer 262. When the passivation layer 256 partially overlaps the second adhesive layer 262, a first width w1 of the exposing area A may be smaller than a second width w2 of the passivation layer 256 (w1<w2).

In another embodiment, the passivation layer 256 may be formed to contact the second adhesive layer 262. When the passivation layer 256 contacts the second adhesive layer 262, one end portion of the passivation layer 256 may contact one end portion of the second adhesive layer 262 and a first width w1 of the exposing area A may be equal to a second width w2 of the passivation layer 256 (w1=w2).

Accordingly, the second width w2 of the passivation layer 256 may be equal to or greater than the first width w1 of the exposing area A (w1≤w2). For example, each of the first and second widths w1 and w2 may be smaller than about 10 mm.

The passivation layer 256 may include an organic insulating material such as benzocyclobutene (BCB) and acrylic resin. For example, the passivation layer 256 may include various resins.

The passivation layer 256 may be formed through a coating method or a printing method. For example, the passivation layer 256 may be formed through a coating method such as a spin coating, a slide coating, a spray coating, a tape casting, a slot die coating, a gravure coating, a knife over edge coating, an offset coating and a curtain coating. In addition, the passivation layer 256 may be formed through a printing method such as a screen printing, an inkjet printing, a gravure printing, an offset printing, a pad printing and a flexographic printing.

The passivation layer 256 of an organic insulating material formed though a coating method may have a thickness of about 1 µm to about 99 µm, and the passivation layer 256 of a resin formed through a printing method may have a thickness equal to or smaller than about 200 µm.

Consequently, in the display device 210 including the touch panel 230 according to an embodiment of the present invention, since the passivation layer 256 is formed in the exposing area A of the lower surface of the touch panel 230 to cover the plurality of second lines 254 exposed outside the display panel 220, corrosion and electrical opening of the plurality of second lines 254 are prevented. In addition, since the total thickness of the display device 210 is reduced, slim profile of the display device 210 is obtained. Furthermore, since the passivation layer 256 is selectively formed in the exposing area A of the lower surface of the touch panel 230 through a coating method or a printing method, an additional protecting film is omitted and fabrication cost is reduced.

It will be apparent to those skilled in the art that various modifications and variations can be made in a display device including a touch panel of the present disclosure without departing from the sprit or scope of the invention. Thus, it is intended that the present invention covers the modifications and variations of this invention provided they come within the scope of the appended claims and their equivalents.

What is claimed is:
1. A display device, comprising:
    a cover glass;
    a first adhesive layer under the cover glass;
    a touch film attached to the cover glass by the first adhesive layer;
    a second adhesive layer under the touch film;
    a display panel attached to the touch film by the second adhesive layer, wherein a size of the display panel is smaller than a size of the touch film such that an edge portion of the touch film constitutes an exposing area exposed outside the display panel; and
    a passivation film selectively covering a plurality of conductive lines not covered by the second adhesive layer in the exposing area, the plurality of conductive lines being disposed on a lower surface of the touch film.

2. The display device according to claim 1, wherein a plurality of first lines parallel to and spaced apart from each other are formed on an upper surface of the touch film, the plurality of conductive lines parallel to and spaced apart from each other are formed directly on the lower surface of the touch film, and the plurality of first lines cross the plurality of conductive lines.

3. The display device according to claim 2, wherein the passivation film covers the plurality of conductive lines exposed outside the display panel.

4. The display device according to claim 2, wherein the passivation film is disposed between the touch film and the second adhesive layer.

5. The display device according to claim 1, wherein the passivation film includes one of an organic insulating material and a resin.

6. The display device according to claim 1, wherein a first width of the passivation film is equal to or greater than a second width of the edge portion exposed outside the display panel.

7. The display device according to claim 1, wherein the second adhesive layer directly contacts the lower surface of the touch film.

8. The display device according to claim 1, wherein a size of the touch film is greater than a size of the second adhesive layer.

9. The display device according to claim 1, wherein a lower surface of the passivation film is exposed outside the display panel.

10. The display device according to claim 1, wherein the passivation film has a rectangular ring shape.

11. A method of fabricating a display device, the method comprising:
    attaching a touch film to a cover glass by a first adhesive layer;
    attaching a display panel to the touch film by a second adhesive layer, wherein a size of the display panel is smaller than a size of the touch film such that an edge portion of the touch film constitutes an exposing area exposed outside the display panel; and
    selectively forming a passivation film to cover a plurality of conductive lines not covered by the second adhesive layer in the exposing area, the plurality of conductive lines being disposed on a lower surface of the touch film.

12. The method according to claim 11, wherein a plurality of first lines parallel to and spaced apart from each other are formed on an upper surface of the touch film, the plurality of conductive lines parallel to and spaced apart from each other are formed on the lower surface of the touch film, and the plurality of first lines cross the plurality of second lines.

13. The method according to claim 12, wherein the passivation layer film covers the plurality of conductive lines exposed outside the display panel.

14. The method according to claim 11, wherein the passivation film is formed through one of a coating method and a printing method.

* * * * *